US006487917B1

(12) United States Patent
Van Cleve et al.

(10) Patent No.: US 6,487,917 B1
(45) Date of Patent: *Dec. 3, 2002

(54) LOW THERMAL STRESS BALANCE BAR FOR A CORIOLIS FLOWMETER

(75) Inventors: Craig Brainerd Van Cleve, Lyons; Gregory Treat Lanham, Longmont, both of CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/563,026

(22) Filed: May 2, 2000

(51) Int. Cl.⁷ .................................................. G01F 1/84
(52) U.S. Cl. .............................. 73/861.357; 73/861.355
(58) Field of Search ..................... 73/861.357, 861.356, 73/861.355

(56) References Cited

U.S. PATENT DOCUMENTS

| 5,365,794 A | 11/1994 | Hussain et al. |
| 5,381,697 A | 1/1995 | van der Pol |
| 5,398,554 A | 3/1995 | Ogawa et al. |
| 5,476,013 A | 12/1995 | Hussain et al. |
| 5,691,485 A | 11/1997 | Endo et al. |
| 5,736,653 A | 4/1998 | Drahm et al. |
| 5,979,246 A | * 11/1999 | VanCleve et al. ...... 73/861.357 |
| 5,987,999 A | * 11/1999 | VanCleve et al. ...... 73/861.357 |

FOREIGN PATENT DOCUMENTS

| EP | 10227677 | 8/1998 |
| EP | 11030543 | 2/1999 |
| JP | 10-227677 | 8/1998 |
| JP | 11-030543 | 2/1999 |
| WO | WO 00/12970 | 3/2000 |

* cited by examiner

Primary Examiner—Benjamin R. Fuller
Assistant Examiner—Carey D. Mack
(74) Attorney, Agent, or Firm—Faegre & Benson LLP

(57) ABSTRACT

A Coriolis flowmeter that uses a balance bar to allow stress in the active and inactive portions of the flow tube to be as low as possible for any thermal condition. The balance bar has a middle segment that is compliant in the axial direction so that changes in length of the balance bar ends do not impose a significant axial force on the flow lube. This ensures that the thermal stresses on the active and inactive portions of the flow tube are always equal. This state of stress equality is the lowest possible stress state for the flow lube. As a result of the axially compliant balance bar, the remaining stress in the flow tube is only a function of the differential expansion between the flow tube and the case. Balance bar expansion and contraction is eliminated and has no impact on the flow tube stress.

32 Claims, 9 Drawing Sheets

LOW THERMAL STRESS BALANCE BAR FOR A CORIOLIS FLOWMETER

FIELD OF THE INVENTION

This invention relates to a Coriolis flowmeter having a balance bar that can be subjected to a wide range of thermal conditions without applying stresses to the flow tube to which the balance bar is coupled.

PROBLEM

Single straight tube Coriolis flowmeters traditionally have a concentric balance bar that is coaxial with the flow tube. The balance bar vibrates 180 degrees out of phase with respect to the flow tube to counterbalance the drive mode vibration of the flow tube. The balance bar and the material filled flow tube comprise a dynamically balanced structure that vibrates at its resonant frequency. The ends of the balance bar are rigidly affixed to the flow tube via annular brace bars. Regions of no vibration, called nodes, are located in the brace bars and define the ends of the active portion of the flow tube.

The radial distance between the outer surface of the flow tube and the inner surface of the balance bar is traditionally kept small both for reasons of compactness and for tuning the resonant frequency of the balance bar. The small difference in diameter between the flow tube and the balance bar results in a connection that is very rigid.

A problem with prior art designs of balance bars is that they impose a significant thermal stress on the flow tube. There are three distinct types of thermal stress of a Coriolis flowmeter. The first is thermal shock. If a Coriolis flowmeter in a cold climate suddenly receives a hot material, the hot flow tube attempts to expand, but is restrained by the surrounding cold balance bar and flowmeter case. Prior art designs use a titanium flow tube having a low modulus of elasticity. The low thermal expansion rate and the high yield strength of titanium enable the flow tube to bear the high stress of thermal shock without damage.

The second type of thermal stress is that due to an elevated or lowered uniform temperature of the Coriolis flowmeter. This thermal stress is common in chemical or food plants where Coriolis flowmeter cases are insulated or heated so as to maintain the entire meter at the material temperature. If the entire Coriolis flowmeter were titanium, a uniform meter temperature would not result in any thermal stresses, but titanium is too expensive to use for the entire meter. Most prior art Coriolis flowmeters have a titanium flow tube because of its low expansion and low modulus of elasticity. For cost reasons they have a stainless steel balance bar and case even though titanium would be the preferred material. Thermal stress is produced in these Coriolis flowmeters at elevated uniform temperatures because these different materials have different moduli of expansion. A Coriolis flowmeter that is stress free at 70 degrees has significant stresses at a uniform 200 degrees because the stainless steel balance bar and case expand at more than twice the rate of the titanium flow tube.

In the third type of thermal loading, stress is imposed on the flow tube by a steady state thermal condition in which the material and the environment have different temperatures. A Coriolis flowmeter measuring hot material in a cold climate eventually reaches a state of thermal equilibrium in which the titanium flow tube reaches the material temperature while the balance bar is only slightly cooler. The case, however, can be much cooler depending on the ambient conditions. If the case is exposed to a cold wind, for example, the case temperature may be only a few degrees above the ambient temperature. Stresses are generated when the cool case restrains attempted expansion by the balance bar and the flow tube. Stresses are also generated when the stainless steel balance bar attempts to expand at twice the rate of the titanium flow tube.

Commercially available single straight tube flow Coriolis flowmeters must be able to withstand all three types of thermal loading without suffering permanent damage and ideally without excessive error in the material measurement. The balance bar ends are rigidly affixed to the flow tube via brace bars. This effectively divides the flow tube into three portions. The central portion, between the brace bars and within the balance bar is the active portion of the flow tube. This portion vibrates out of phase with respect to the balance bar. The two portions of the flow tube that extend from the ends of the balance bar to the case ends do not vibrate and are the inactive portions of the flow tube.

When the above described prior art Coriolis flowmeter is exposed to the first type of thermal loading, thermal shock, both the active and inactive portions of the flow tube experience the same thermal stress. This is due to the fact that neither the balance bar, which constrains the active portion of the flow tube, nor the case, which constrains the inactive portions of the flow tube change temperature or length and the three portions of the flow tube quickly attain the same elevated temperature as the material and have the same thermal stress. When the prior art Coriolis flowmeter is exposed to the second type of thermal loading in having a uniform elevated temperature, the three portions of the flow tube once again experience the same thermal stress. The balance bar and case are both stainless steel and expand at the same rate. The titanium flow tube, attempts to expand at a different rate but is restrained by the balance bar and case.

Under the third thermal condition of thermal loading, the flow tube and the balance bar nearly attain the material temperature while the case remains cold. The hot balance bar expands its length while the cold case does not. The inactive flow tube portions are between the case ends and the lengthening balance bar. The balance bar and case both have much larger cross section areas than the flow tube and force the inactive portions of the flow tube to decrease in length. Since the inactive flow tube portions are hot and if unconstrained would be increasing in length, the forced decrease in length results in stress that can even exceed the yield strength of the titanium flow tube. Meanwhile, the active portion of the flow tube is constrained at its ends by the connections to the hot stainless steel balance bar. Stainless steel has a much greater expansion coefficient than the titanium of the flow tube. Depending on the temperature differential between the balance bar and the flow tube, the active portion of the flow tube could be put in tension since the balance bar temperature is nearly equal to the flow tube temperature. It could also be put in compression as when the balance bar temperature is lower than the flow tube temperature.

The situation in which the inactive portion of the flow tube is highly stressed by temperature gradients is a problem with prior art flow Coriolis flowmeters. The problem is generally solved in prior art Coriolis flowmeters by limiting the temperature range over which the Coriolis flowmeters may be operated. This is undesirable since many customers would like to measure material flow rate at temperatures that exceed the limits dictated by thermal stress.

SOLUTION

The present invention overcomes the above and other problems by use of a balance bar that allows the stresses in the active and inactive portions of the flow tube to be as low as possible for any thermal condition. The balance bar has a middle segment that is compliant in the axial direction so that changes in length of the balance bar ends do not impose a significant axial force on the flow tube. This ensures that the thermal stresses on the active and inactive portions of the flow tube are always equal. This state of stress equality is the lowest possible stress state for the flow tube. As a result of the axially compliant balance bar, the remaining stress in the flow tube is only a function of the differential expansion between the flow tube and the case. Balance bar expansion and contraction is eliminated and has no impact on the flow tube stress.

A further advantage of the balance bar of the present invention is cost. Most prior art Coriolis flowmeters require a stainless steel balance bar to keep the cost reasonable. In order to extend the temperature range of a Coriolis flowmeter, the balance bar of the prior art is required to have an expansion coefficient as near as possible to that of the flow tube material (titanium). The best balance bar of the prior art would be one made entirely of titanium. However, the cost of a titanium balance bar in larger sized Coriolis flowmeters can be as much as six times that of a stainless steel balance bar. The balance bar of the present invention has an increased axial compliance that does not impose axial forces on the flow tube. The balance bars thermal expansion is of no concern and thus can be made of less expensive material and have a wide temperature range.

There are several possible exemplary embodiments of the present invention. A first embodiment is a balance bar having two independent end portions and a void for a center portion. Each end portion is fastened to a respective brace bar and, via the brace bars, to the ends of the active portion of the flow tube. The independent balance bar end portions behave as cantilever beams that are designed to have the resonant frequency of the material filled flow tube. The void enables the lowering of the balance bar drive mode frequency to that of the flow tube without the added balance bar mass of prior art meters. It does this by removing stiffness from the balance bar. This dynamically balances the Coriolis flowmeter. The driver comprises a drive coil that is fastened to the case because of the void in the central portion of the balance bar, and a magnet fastened to the flow tube. The independent balance bar end portions are passively driven by the motion of the brace bars in response to the drive mode vibration of the flow tube. The independent balance bar end portions respond to the drive mode vibration of the flow tube and apply a torque to the brace bar regions that counters the torque applied to the brace bars by the ends of the active portion of the flow tube. The deflection of the balance bar end portions also counter the momentum of the vibrating flow tube.

This balance bar design has an added benefit beyond reduced cost and extended temperature range with no resulting stress on the flow tube. A balance bar in prior art single tube flowmeters has been able to counterbalance the vibration of the flow tube in the drive mode, but it does not balance the vibration of the flowmeter caused by the Coriolis forces applied to flow tube during conditions of material flow. Coriolis forces and deflections are applied to a vibrating flow tube with material flow. The two axial halves of the flow tube have applied Coriolis forces of opposite directions. The resulting Coriolis deflections of the two axial halves of the flow tube are also in opposite directions. These forces and deflections are proportional to the material flow rate and they generate vibrations that cannot be counterbalanced by fixed weights on a traditional balance bar.

The balance bar of the present invention is able to counterbalances these Coriolis forces because of the independence of its two end portions. The void in the center of the balance bar lowers the resonant frequency of the balance bar end portions in a mode in which they vibrate out of phase with each other. This mode is referred to as the Coriolis-like mode because of its shape. The void lowers the resonant frequency of this mode to below the drive frequency. Each balance bar end portion resonates out of phase with the flow tube in the drive mode frequency of vibration. Because Coriolis deflections of the flow tube occur at the drive mode frequency, the two independent balance bar end portions respond to these Coriolis deflections as readily as to the drive mode deflections. The driving force for these two responses is the same. It is the motion of the brace bars. The left balance bar end portion has the same response to the Coriolis excitation as it does for the drive mode excitation. The difference between the two excitation modes is that the drive mode excitation is of a constant amplitude and the two ends of the active of the flow tube are in phase with each other. The Coriolis excitation has an amplitude that is proportional to the flow rate and the two ends of the active portion of the flow tube are 180 degrees out of phase with each other. The independent balance bar end portions have Coriolis-like deflections that effectively counterbalance the Coriolis forces of the flow tube. The out-of-phase Coriolis-like deflections increase the amplitude of vibrations of the balance bar and are out of phase with the Coriolis vibrations of the flow tube as the flow rate (and thus the Coriolis force) increases.

The counterbalancing of the Coriolis force vibrations by the balance bar end portions produces a more accurate Coriolis flowmeter. The unbalanced Coriolis forces of prior art Coriolis flowmeters result in a shaking of the Coriolis flowmeter at the drive mode frequency. This shaking, which is proportional to flow rate alters the Coriolis acceleration of the material flow and the resultant output signals of the pick offs. Compensation could be made for this error except that it is dependent upon Coriolis flowmeter mounting stiffness. A Coriolis flowmeter with rigid mount would have a slight error while a Coriolis flowmeter with a soft mount would have greater error. Since the mounting conditions of a Coriolis flowmeter in commercial use are unknown, it is generally not possible to compensate for them.

An alternative embodiment of the invention has balance bar end portions that are weakly coupled by drive coil brackets. These brackets allow the driver to be mounted in the axial center so that the coil and magnet of the driver can drive the balance bar end portions and flow tube in phase opposition. These brackets are made of sufficiently thin metal and their geometry is such that they allow the balance bar end portions to expand and contract axially with little resistance.

These flexible brackets also allow for the out of phase motion of the two balance bar end portions that counterbalance the applied Coriolis forces.

Another alternative embodiment allows for expansion and contraction of the two balance bar end portions, but does not allow for an out of phase motion of the two end portions. This permits the use of an inexpensive balance bar material along and provides a high temperature range. This embodiment does not allow for the out of phase motion of the balance bar end portions that counterbalances the Coriolis forces.

Yet another embodiment provides a balance bar with independent end portions coupled to a center section by flexible side strips. Cutouts in the center section and balance bar halves increase axial compliance.

In summary, the present invention solves three balance bar problems by decoupling the two end portions of the balance bar. It allows the balance bar to be made of less expensive materials. It allows for a wider temperature range with less axial stress on the flow tube and it provides a more accurate Coriolis flowmeter by counterbalancing the Coriolis forces applied to the flow tube.

An aspect of the invention is a Coriolis flowmeter adapted to receive a material flow at an inlet and to extend said material flow through flow tube means to an outlet of said Coriolis flowmeter; said Coriolis flowmeter also includes:

a balance bar positioned parallel to said flow tube means;

brace bars coupling ends of said balance bar to said flow tube means;

a driver that vibrates said flow tube and balance bar in phase opposition;

pick off means coupled to said balance bar and to said flow tube means to generate signals representing the Coriolis response of said vibrating flow tube means with material flow;

a first end portion of said balance bar extending axially inward from a first one of said brace bars towards a mid-portion of said balance bar;

a second end portion of said balance bar extending axially inward from a second one of said brace bars towards said mid-portion of said balance bar; and an axial mid-portion of said balance bar having a compliance that enables said balance bar to expand and contract axially without imparting any axial stress to said flow tube.

Another aspect is that said mid-potion of said balance bar is a void.

Another aspect is that said flow tube means comprises a straight flow tube.

Another aspect is that said driver is positioned proximate said mid-portion and is coupled to an exterior surface of said flow tube and an inner wall of said case.

Another aspect is that a magnet of said driver is affixed to said exterior surface of said flow tube and a coil of said driver is coupled to said inner wall of said case.

Another aspect is a Coriolis flowmeter adapted to receive a material flow at an inlet and to extend said material flow through flow tube means to an outlet of said Coriolis flowmeter; said Coriolis flowmeter also includes:

a balance bar positioned parallel to said flow tube means;

brace bars coupling ends of said balance bar to said flow tube means;

a driver that vibrates said flow tube and balance bar in phase opposition;

pick off means coupled to said balance bar and to said flow tube means to generate signals representing the Coriolis response of said vibrating flow tube means with material flow;

a first end portion of said balance bar extending axially inward from a first one of said brace bars towards a mid-portion of said balance bar;

a second end portion of said balance bar extending axially inward from a second one of said brace bars towards said mid-portion of said balance bar;

an axial mid-portion of said balance bar;

said mid-portion comprises:

drive coil bracket means;

spring means oriented substantially perpendicular to the longitudinal axis of said flow tube and coupling said drive coil bracket means to the axial inner extremities of said end portions of said balance bar, said spring means having an axial compliance that enables said end portions of said balance bar to change in length without imparting any axial stress to said flow tube exclusive of the stress associated with the force required to flex said spring means as said length of said end portions change.

Another aspect is that said spring means flex as the axial length of said end portions of said balance bar changes with the only resultant axial stress imparted to said flow tube being the stress required to flex said springs means.

Another aspect is that said flow tube means comprises a single straight flow tube.

Another aspect is that said balance bar is co-axial with said flow tube.

Another aspect is that said pick off means comprises a pair of velocity sensors with a first one of said pick offs being coupled to said first end portion of said balance bar and to said flow tube and with a second one of said pick offs being coupled to said second end portion of said balance bar and said flow tube.

Another aspect comprises a case enclosing said flow tube and said brace bars and said balance bar.

Another aspect is that:

said material flow through said vibrating flow tube imparts Coriolis deflections to said flow tube;

said material flow through said vibrating flow tube imparts Coriolis-like deflections to said first and second end portions of said balance bar that are in phase opposition to said Coriolis deflections of said flow tube.

Another aspect is that said first and second end portions of said balance bar vibrate independently in phase with each other for drive mode vibrations imparted to said flow tube by said driver.

Another aspect is that said first and second end portions of said balance bar vibrate out of phase with each other for said Coriolis-like deflections imparted to said balance bar by said Coriolis deflections of said flow tube.

Another aspect is that a first end of said spring means is coupled to said drive coil bracket means;

a second end of said spring means is coupled to the axial inner extremity of said end portions of said balance bar;

said spring means flexes in response to said axial changes in length of said end portions of said balance bar.

Another aspect is that said drive coil bracket means comprises:

a drive coil bracket having a flat surface parallel to a longitudinal axis of said flow tube;

a second bracket having a surface parallel to said longitudinal axis of said flow tube;

said spring means comprises a first set of springs coupling said first drive coil bracket to said axial inner extremities of said end portions of said balance bar;

said flat surface of said first drive coil bracket is adapted to receive a coil of said driver;

a drive magnet is coupled to said flow tube and in magnetic communication with said drive coil;

said spring means further comprising a second set of springs coupling said second said drive coil bracket to said axial a inner extremities of said end portions of said balance bar; and a mass affixed to said flat surface of said second bracket.

Another aspect is that said springs of said first and second set have ends coupled to said inner axial extremities of said balance bar end portions.

Another aspect is that:

said drive coil bracket means is coaxial with said flow tube and has an axial length less than the distance between said axial inner extremities of said balance bar end portions;

elongated support bars couple said axial inner extremities of said balance bar end portions to the axial outer extremities of said drive coil bracket means;

said elongated support bars are positioned in a vibrationally neutral plane of said balance bar and are oriented parallel to said longitudinal axis of said flow tube;

slots are in the walls of said drive coil bracket means, said slots are parallel to and proximate said outer axial extremities of said drive coil bracket means;

the wall material of said drive coil bracket means between said slots; and said outer axial extremities of said drive coil bracket means define a first set of springs that flex in response to changes in the axial length of said balance bar end potions;

Another aspect is that:

circumferentially oriented slots are in the walls of said balance bar end portion proximate said axial inner extremities of said balance bar end portions;

the wall material between said slots and said balance bar end portions; and define a second set of springs that flex axially in response to changes in the axial length of said balance bar end potions and in response to changes in the length of said flow tube.

Another aspect is that:

said support bar and set first and second set of springs define springs that flex in response to changes in the axial length of said balance bar end potions without imparting axial stress to said flow tube in excess of the stress associated with the force required to flex said first and second set of springs and said support bar.

Another aspect is that:

a top portion of said drive coil bracket has a flat surface with an opening for receiving a coil of said driver;

a magnet of said driver is in electromagnet communication with said drive coil and is coupled to said flow tube.

Another aspect is that:

said drive coil bracket means is cylindrical and has a diameter substantially equal to the diameter of said balance bar.

Another aspect is that said drive coil bracket means comprises:

a first drive coil bracket affixed to a top portion of said first balance bar end portion proximate said inner axial extremity of said first end portion;

a second drive coil bracket affixed to a bottom portion of said second balance bar end portion proximate said inner axial extremity of said second end portion;

spring means oriented substantially perpendicular to said longitudinal axis of said flow tube that couples said first drive coil bracket to said second drive coil bracket;

said spring means is adapted to flex about its end in response to changes in the axial length of said end portions of said balance bar;

said spring means having a flexibility that enables said end portions of said balance bar to change in length to change in length without imparting a stress to said flow tube in excess of a stress associated with the force required to flex said springs.

Another aspect is that said spring means comprises:

a first end of said spring means coupled to said first drive coil bracket;

a second end of said spring means coupled to said second drive coil bracket.

Another aspect includes a first mass affixed to a lower portion of said inner axial extremity of first end potion of said balance bar;

a second mass affixed to an upper portion of said inner axial extremity of said second end potion of said balance bar.

Another aspect is that said driver comprises:

a first drive coil affixed to a surface of said first drive coil bracket;

a first magnet in magnetic communication with said first drive coil and affixed to said flow tube;

a second drive coil affixed to a surface of said second drive coil bracket;

a second magnet in magnetic communication with said second drive coil and affixed to said flow tube;

said drive coils being and said magnets being effective in response to the receipt of a drive signal coils for vibrating said flow tube and said balance bar in phase opposition.

DESCRIPTION OF THE DRAWINGS

The invention may be better understood from a reading of the following detailed description thereof taken in conjunction with the drawings in which.

DETAILED DESCRIPTION

Figure 1:
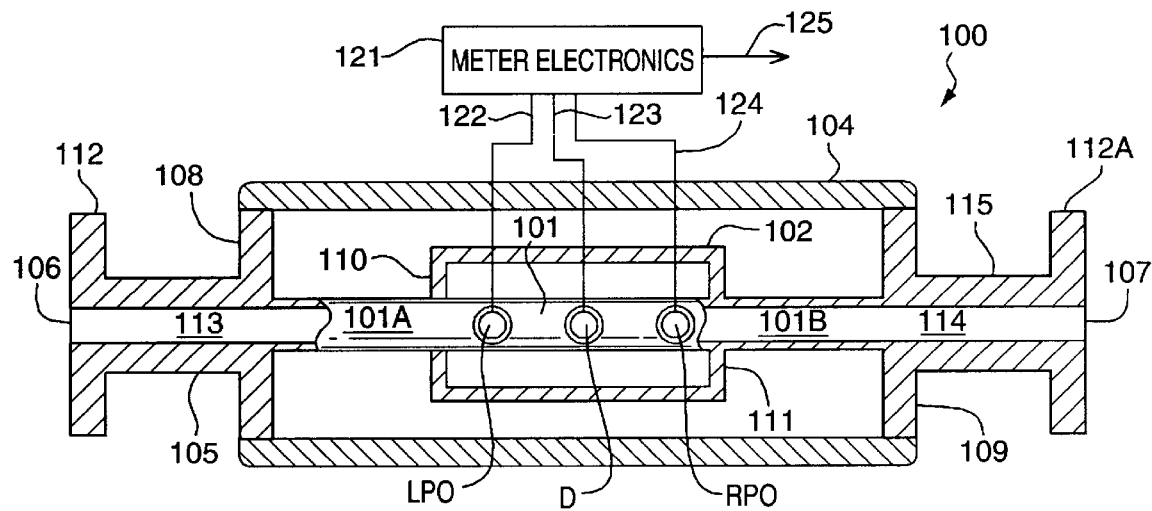
FIG. 1 discloses a prior art straight tube Coriolis flowmeter.

Description of FIG. 1

FIG. 1 discloses a straight tube Coriolis flowmeter 100 having a straight flow tube 101 surrounded by balance bar 102 with flow tube 101 and balance bar 102 being surrounded by case 104. Brace bars 110 and 111 couple end portions of balance bar 102 to the outer walls of flow tube 101. Flow tube 101 also includes flow tube extension elements 101A and 101B. Element 101 is the active portion of the flow tube between brace bars 110 and 111. Extension elements 101A and 101 B are the inactive portions of the flow tube and connect brace bars 110 and 111 to case ends 108 and 109. Elements 113 and 114 may be considered to be a portion of the flow tube and since these elements extend through neck 105 and 115 to flanges 112 and 112A. Element 106 is the material input of the flowmeter. Element 107 is the material output of the flowmeter. Meter electronics 121 applies a signal over path 123 to Driver D to vibrate balance bar 102 and flow tube 101 in phase opposition. Pick offs (velocity sensors) LPO and RPO detect the vibrations of the flow tube 101 with material flow and generate output signals indicating phase of the Coriolis response. The pick off and output signals are applied over paths 122 and 124 to meter electronics 121 which generates an output on path 125 containing information regarding the material flow.

Balance bar 102 is rigidly coupled to flow tube 101 by brace bars 110 and 111. Flow tube 101 is tightly coupled to case ends 108 and 109 by flow tube portions 101A and 101B. This tight coupling of the flow tube to the balance bar and to the case creates thermal stresses on the flow tube during conditions in which the flow tube temperatures suddenly increases with respect to the balance bar 102 and case 104 as well as steady state conditions in which the flow tube temperature differs from that of balance bar 102 and/or case 104.

There are three possible types of thermal stress within a Coriolis flowmeter. The first type is thermal shock. In this, the flow tube 101 may suddenly receive a hot (or cold) material. The hot flow tube 101 attempts to expand, but is restrained by the surrounding cold balance bar 102 and case 104. This stress generated under this condition results in the active portion 101 of the flow tube attempting to expand axially more than the cold balance bar. Inactive flow tube portions 101A and 101B are subject to this stress and attempt to expand axially more than does case 104. Problems resulting from the thermal stress are minimized if the flow tube is made of titanium because of the low modulus of elasticity of titanium. Although the use of a titanium flow tube minimizes the stress problems, the stress on the flow tube can alter the rigidity of the flow. This degrades the accuracy of the output information generated by the vibrating flow tube and, in turn, the Coriolis flowmeter.

A second type of thermal stress occurs when the entirety of the flowmeter is subject to an elevated or lowered uniform temperature. Even with the use of a titanium flow tube, the flow tube experiences thermal stress since the stainless balance bar 102 and case 104 attempt to expand it more than twice the rate of the titanium flow tube 101. Even if the titanium flow tube is able to withstand this stress without permanent mechanical deformation, its altered stiffness degrades the accuracy of the output information generated.

A third type of thermal stress is characterized by a steady state thermal condition in which the flowing material and the environment have different temperatures. A Coriolis flowmeter measuring hot material in a cold climate eventually achieves a state of thermal equilibrium in which the titanium flow tube reaches the material temperature with the balance bar being only slightly cooler. The case can be much cooler, depending upon ambient conditions, such as use in the Arctic. Stresses are generated when the cool case restrains attempted expansion by the balance bar and the flow tube. Stresses-are also generated when the stainless steel balance bar attempts to expand at twice the rate of the titanium flow tube. Under these conditions, the hot balance bar attempts to expand in length while the cold case does not. The inactive portions of the flow tube 101A and 101B are connected between the case ends and the expanding balance bar. The balance bar and case both have much larger cross sections then the flow tube and they force the inactive portions 101A and 101B of the flow tube to decrease in length. Since these inactive flow tube portions are attempting to increase in length, the force applied by the larger balance bar stresses flow tube portions 101A and 101B. The stress levels can exceed the yield strength of a titanium flow tube. Meanwhile, the active portion 101 of the flow tube is constrained at its ends by the balance bar and the brace bars. The stainless steel balance bar has a much greater coefficient of expansion than the titanium flow tube. Thus, depending upon the temperature differentials between the stainless steel balance bar and the titanium flow tube, the active portion of the flow tube 101 could be put in tension. It also could be put in compression when the balance bar temperature is lower than the flow tube temperature.

It can therefore been seen that it is a problem that a straight tube prior art Coriolis flowmeter as shown in FIG. 1 suffers from thermal stresses on the flow tube that adversely degrade the accuracy of the output information generated by the flowmeter and in extreme cases can further permanently damage the flow tube.

Figure 2:
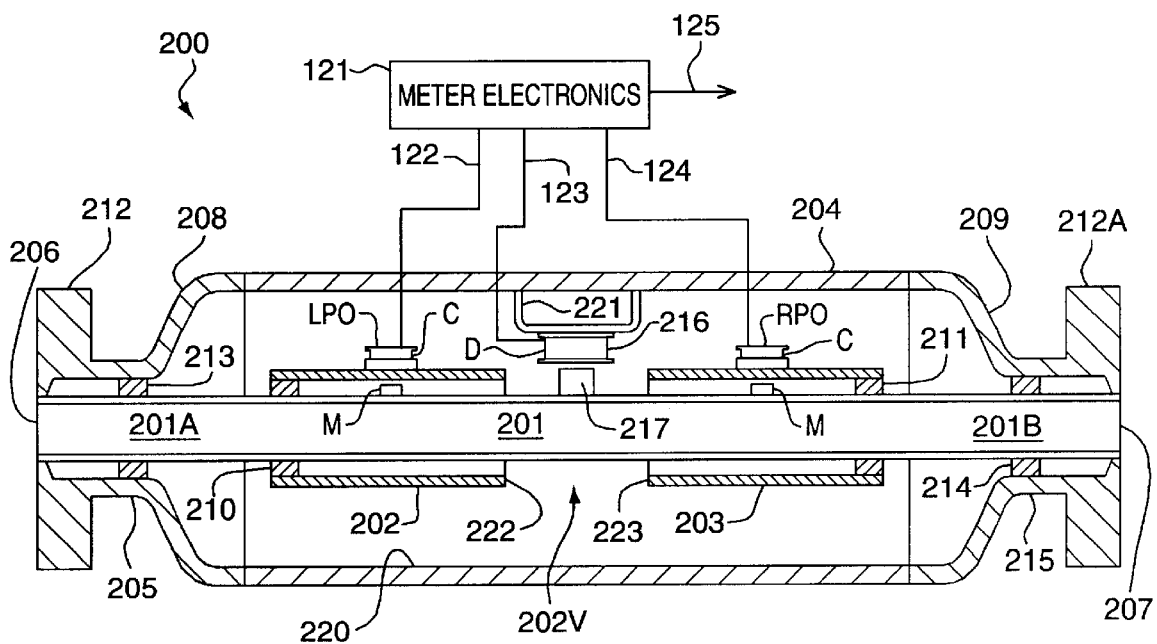
FIG. 2 discloses a straight Coriolis flowmeter in accordance with a first exemplary embodiment of the invention.

Description of FIG. 2

FIG. 2 discloses a first possible exemplary embodiment of the invention comprising a straight tube Coriolis flowmeter 200 that is similar in many respects to prior art Coriolis flowmeter 100 of FIG. 1. The difference is that the center section of the balance bar of FIG. 2 has been removed.

FIG. 2 discloses a straight tube Coriolis flowmeter 200 having a flow tube having active portion 201 and inactive portions 201A and 201B. Coriolis flowmeter 200 further includes balance bar end segments 202, 203 and a void center segment 202V, a case 204 and end flanges 212 and 212A. Case 204 has end portions 208 and 209 connected by necks 205 and 215 to end flanges 212 and 212A. The inlet of the flowmeter is element 206 on the left; the outlet is element 207 on the right. Cone connect links 213 and 214 couple the inner wall of the necks 205 and 215 to the exterior surface of flow tube elements 201A and 201B. Brace bars 210 and 211 couple the outer axial end portions of brace bar segments 202 and 203 to flow tube 201. Pick offs LPO and RPO each comprise a coil C and a magnet M. Driver D comprises a magnet 217 affixed to flow tube 201 and coil 216 connected to a flat surface of drive coil bracket 221 whole leg portions are connected to the inner wall 220 of case 204. Element 222 is the axially inner end of balance bar segment 202; element 223 is the axially inner end of balance bar segment 203.

In the same manner as described for FIG. 1, driver D causes the flow tube 201 and the brace bar segments 202 and 203 to vibrate in phase opposition. The vibration of flow tube 101 extends vibratory forces through brace bars 110 and 111 to the end portions of balance bar end segment 102 and 103 to cause them to vibrate in phase opposition to the flow tube 101 with respect to drive mode vibrations of the flow tube. Pick offs (velocity sensors) LPO and RPO detect the Coriolis response of vibrating flow tube 201 with material flow and generate output signals indicative of the material flow. These output signals are extended over paths 122 and 124 to meter electronics 121 which processes the signals and generates output information indicative of the material flow.

Since Coriolis flowmeter 200 of FIG. 2 has a void 202V for the center portion of its balance bar, the two independent balance bar end segments 202 and 203 are fastened to the respective brace bars 210 and 211 and, via the brace bars, to the active portion 201 of the flow tube. The balance bar end segments 202 and 203 behave as cantilever beams and each has the same resonant frequency as the material filled vibrating flow tube. Since the flow tube and the balance bar end segments 202 and 203 are vibrated in phase opposition, and since they have the same resonant frequency, they constitute a dynamically balanced vibratory structure that imparts no vibration external to the flowmeter. /

Figure 3:
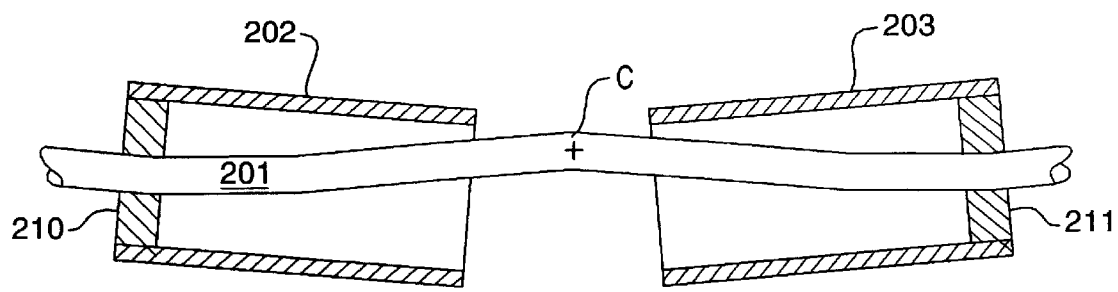
FIGS. 3, 4, and 5 disclose mode shapes of the flow tube and balance bar in accordance with the present invention.
Figure 4:
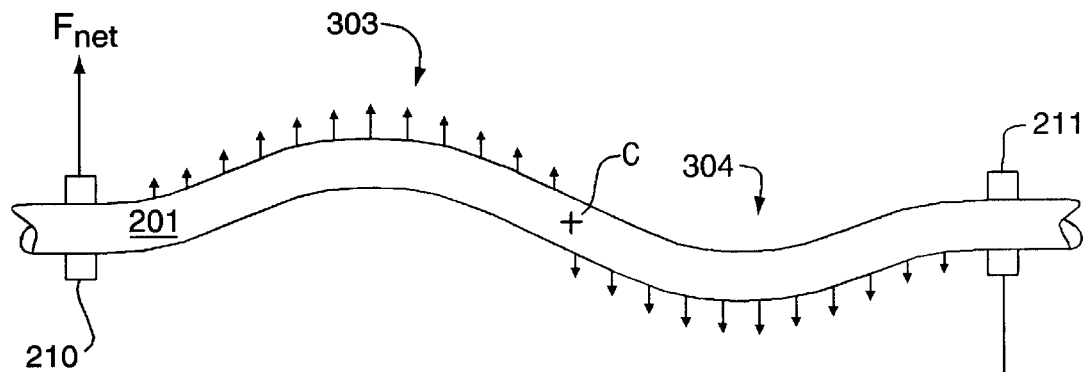
Figure 5:
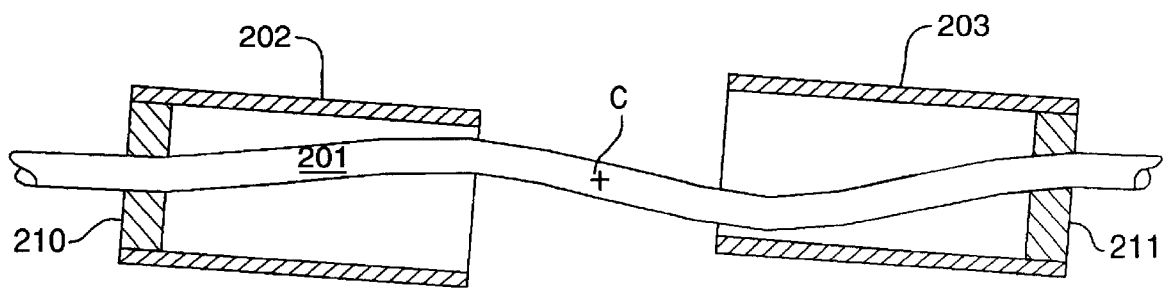

Description of FIGS. 3, 4, and 5

FIG. 3 shows how the independent balance bar segments 202 and 203 of FIG. 2 respond to the drive mode vibration of flow tube 201. This drive mode vibration generates torques which are applied by the flow tube to brace bars 210 and 211. This torque is extended to end segments 202 and 203 of the balance bar to cause them to vibrate in phase opposition to their corresponding portion of flow tube 201. This deflection of the balance bar end segments counters that of the vibrating flow tube so that the flow tube and the balance bar end segments together cancel the vibration and torque of one another and generate a dynamically balanced vibrating structure. This balance bar has the added benefits that it reduces the costs of the materials used in the balance bar and provides a lower stress on the flow tube over an extended temperature range.

The balance bar of the Coriolis flowmeter of FIG. 1 counter-balances the vibration of the flow tube in the drive mode, but it does nothing to balance the vibration of the flowmeter caused by the Coriolis forces applied to the flow tube during material flow. FIG. 4 illustrates the Coriolis forces and resultant deflections on a vibrating flow tube 201 with material flow. The arrows illustrate that the Coriolis forces applied to the two halves of the active flow tube 201 are in opposite directions. On FIG. 4, the Coriolis force arrows on the left half of the flow tube are in an upward direction; those on the right half are in a downward direction. As a result, the resultant Coriolis deflections on the two halves of the flow tube are in opposite directions. These forces and deflections are proportional to the magnitude of the material flow rate and cannot be counter balanced by affixing weights to the balance bar. Also, the forces applied to the flow tube continuously vary in magnitude and direction sinusoidally at the drive mode frequency. For the conditions shown in FIG. 4, it can be seen that flow tube 201 attempts to rotate clockwise about its center C because the upward forces are applied to its left half 303 and downward forces are applied to its right half 304. Later in the vibratory cycle, these forces change direction and the flow tube then attempts to rotate about its center C in a counterclockwise direction. This oscillatory change of rotational forces on the flow tube creates undesired vibrations, which can adversely affect the output accuracy of the material flow information generated by the flowmeter.

Since the Coriolis deflections of FIG. 3 occur at the drive mode frequency, it follows that the balance bar end segments respond to these Coriolis deflections of the flow tube as readily as it does to the drive mode deflections of the flow tube. The driving force for these two responses is the same. It is the vibratory motion of brace bars 210 and 211. This is shown in FIG. 5. It can be seen that the left balance bar segment 202 has the same response to the same excitation as the left balance bar half of FIG. 3. The difference between the two excitation modes is that the drive excitation is a constant amplitude and the ends of the active portion of flow tube 201 are in phase with each other. The Coriolis excitation mode has amplitude that is proportional to the material flow rate and the vibrations of the two end segments 202 and 203 of the balance bar are 180° out of phase with each other. The balance bar end segments 202 and 203 effectively counter balance the Coriolis forces on the flow tube because they increase their amplitude of vibration as the flow rate and the Coriolis force increases. It can be seen in FIG. 5 that the deflections of balance bar end segments 202 and 203 are out of phase with the Coriolis deflections of their corresponding portions of flow tube 201. As a result, the Coriolis forces applied to the vibrating flow tube with material flow are effectively counter balanced by the off setting vibratory deflections of their corresponding portions of balance bar end segments 202 and 203. This counter balancing of the Coriolis forces produces a more accurate Coriolis flowmeter since the unbalanced Coriolis forces of the prior art Coriolis flowmeters that result in a shaking of the Coriolis flowmeter at the drive frequency are eliminated in the Coriolis flowmeter of the present invention.

Figure 6:
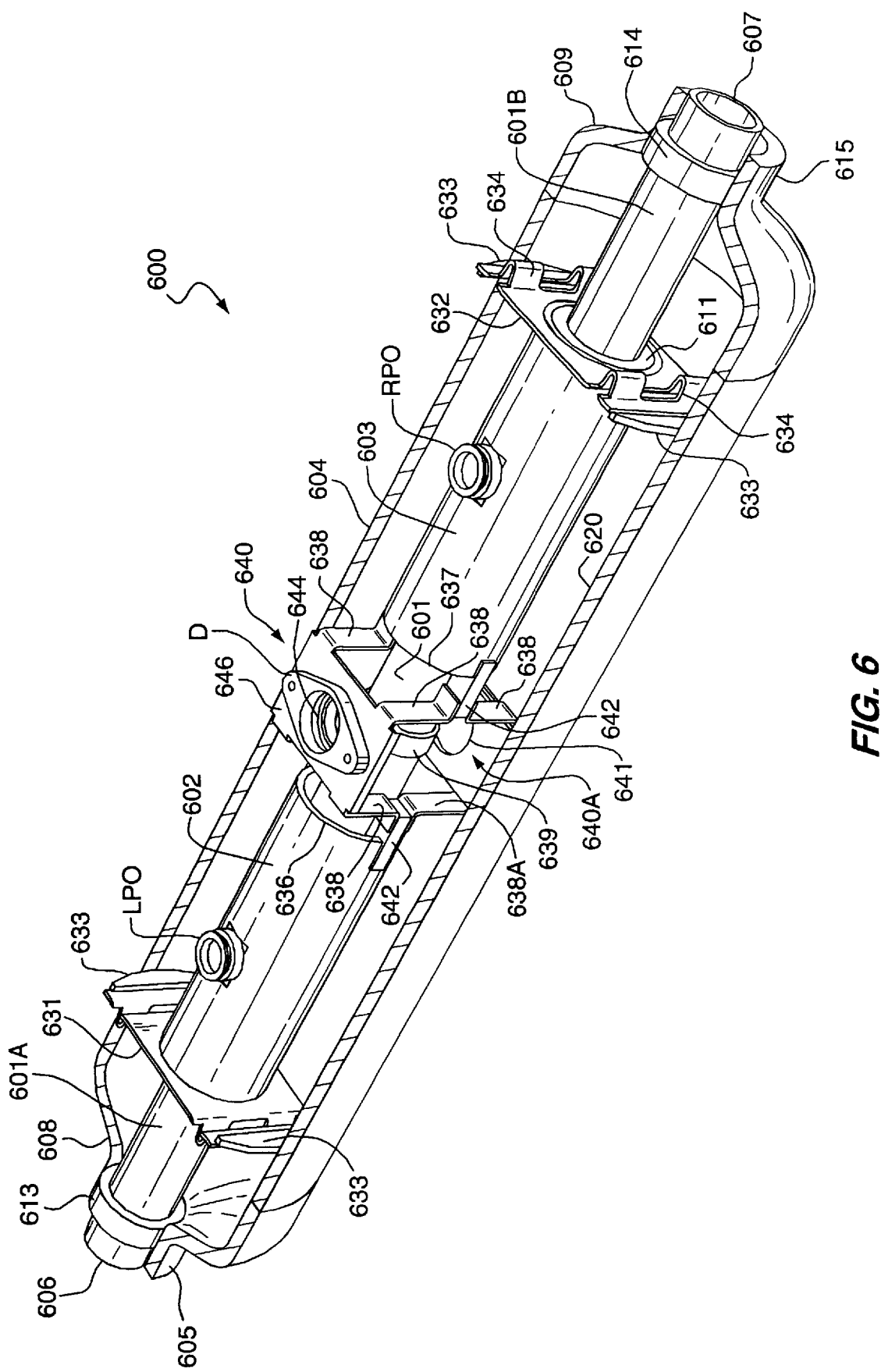
FIGS. 6 and 7 disclose a straight tube Coriolis flowmeter in accordance with a second exemplary embodiment of the invention.
Figure 7:
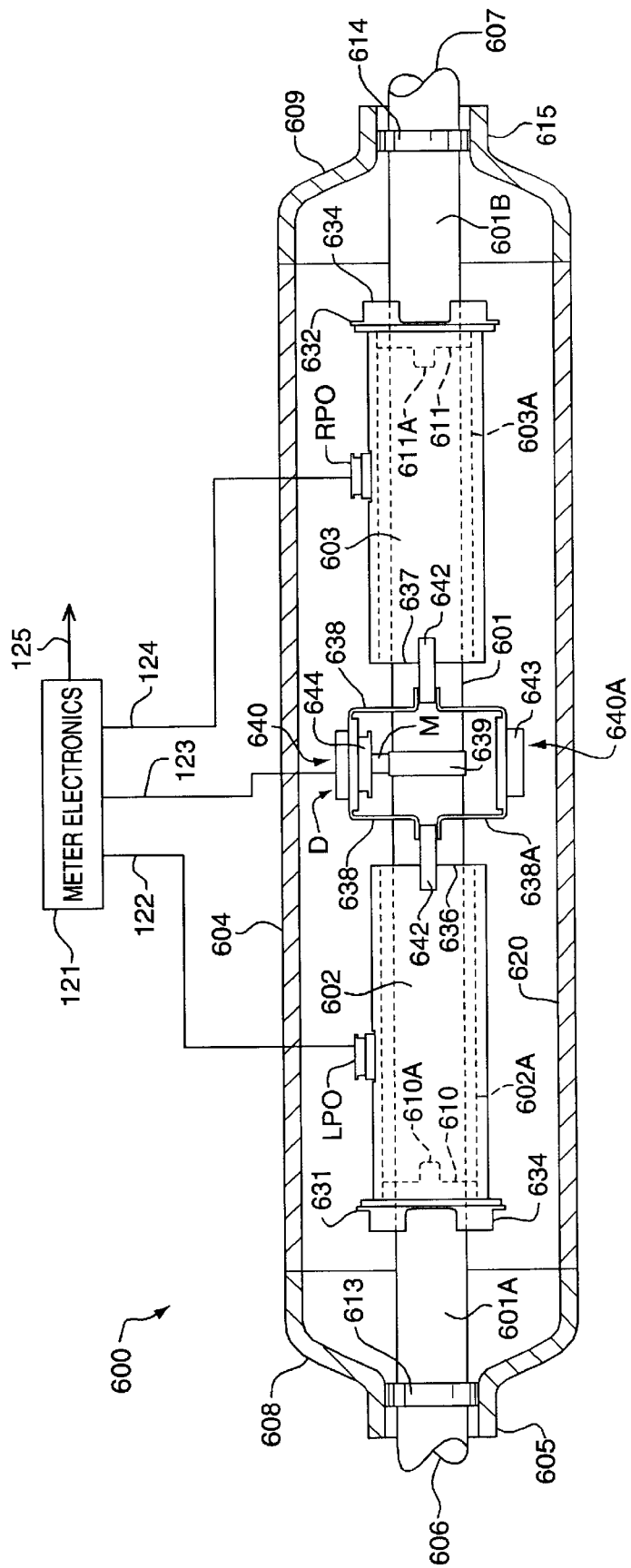

Description of FIGS. 6 and 7

FIGS. 6 and 7 disclose an alternative embodiment of a Coriolis flowmeter 600 embodying the present invention. This embodiment differs from that of FIG. 2 primarily in the fact that the two balance bar end segments 602 and 603 are coupled by a center section comprising a flexible drive coil bracket 640. This bracket 640 allows a coil of driver D to be mounted in the traditional location as part of the balance bar. The driver coil and an associated magnet on the flow tube can directly drive the balance bar end sections in phase opposition to the flow tube 601. The drive coil bracket 640 structure includes leaf-springs 638 which are flexible and which allow the balance bar end sections to expand and contract axially with no resulting stress on the flow tube beyond those associated with the force required to flex leaf-springs 638. Leaf-springs 638 also allow the balance bar end segments 602 and 603 to assume a Coriolis-like response that is out of phase to the Coriolis response of the flow tube and which counter balances the Coriolis deflections of the vibrating flow tube.

Drive coil bracket structure 640 includes a flat surface 646 on which driver coil 644 is mounted. This structure 640 includes four leaf-springs 638 which have a right angle bend at their lower extremity and are affixed to support bar 642 which comprise extensions of the inner extremities 636, 637 of balance bar end segments 602 and 603. Element 640A is a bracket having an opening 641 that mounts mass 643. Bracket 640A is coupled to support bars 642 by a lower set of springs 638A. Mass 643 dynamically balances the mass of drive coil 644. The rest of the flowmeter structure of the embodiment of FIGS. 6 and 7 is analogous to that of the embodiment of FIG. 2 and comprises the following described elements. Case 604, case ends 608 and 609, inlet 606, necks 605 and 615, cone connect elements 613 and 614, and flow tube 601 including its inactive end portions 601A and 601B. Case connect links 631 and 632 having out of plane bend element 634, brace bars 610 and 611 including side wall extensions 610A and 611A, inner wall 620 of case 604, pick offs LPO and RPO as well as driver D, magnet bracket 639, magnet M mounted on bracket 639, coil 644, inner walls 602A and 603A of balance bar end segments 602 and 603, and outlet 607. These elements all are analogous to and perform the same functions as their counterparts on the embodiment of FIG. 2.

Springs 638 of FIGS. 6 and 7 have thermal expansion capabilities that do not stress the flow tube 601 as the balance bar end segments 602 and 603 change in length. The lengthening or shortening of the balance bar end segments causes the leg springs to bend. This bending produces only small stresses in the leg springs because of their thinness. The only stress on the flow tube is that associated with the small force required to flex springs 638. This embodiment lowers the resonant frequency of balance bar end segments 602 and 603 in the drive mode to that of the resonant frequency of flow tube 601. It also lowers the resonant frequency of the Coriolis-like mode of the balance bar to below the drive frequency. The lowered resonant frequency of balance bar end segments 602 and 603 permits them to have a Coriolis-like response that is in phase opposition to the Coriolis deflections of flow tube 601. This Coriolis-like response of the balance bar end sections enhances the material flow sensitivity of the Coriolis flowmeter of embodiment of FIGS. 6 and 7 and balances the Coriolis forces on the flow tube.

In the same manner described for the embodiment of FIG. 1, meter electronics 121 applies a signal over path 123 to Driver D to vibrate balance bar 102 and flow tube 101 in phase opposition. Pick offs LPO and RPO detect the vibrations of the flow tube 101 with material flow and generate output signals indicating the magnitude and phase of the Coriolis response. The pick off and output signals are applied over paths 122 and 124 to meter electronics 121 which generates an output on path 125 containing information regarding the material flow.

In summary of the embodiment of FIGS. 6 and 7, flexible drive coil bracket 640 intermediate balance bar end segments 602 and 603 lowers the resonance frequency of segments 602 an 603 in the drive mode to that of flow tube 601. Flexible drive coil bracket 640 also lowers the resonant frequency of balance bar end segments 602 and 603 in the Coriolis-like deflection mode to below drive frequency. This enhances the Coriolis-like out of phase response of the balance bar end segments 602 and 603 with respect to flow tube 601. This enhances the material flow sensitivity of the Coriolis flowmeter. However, drive coil bracket 640 must be carefully designed to prevent the generation of unwanted vibrations that could adversely affect the accuracy or the output data of the Coriolis flowmeter. This embodiment is advantageous in that leg-springs 638 easily flex and protect flow tube 601 from axial stress in response to changes in the axial length of balance bar end segments 602 and 603.

Figure 8:
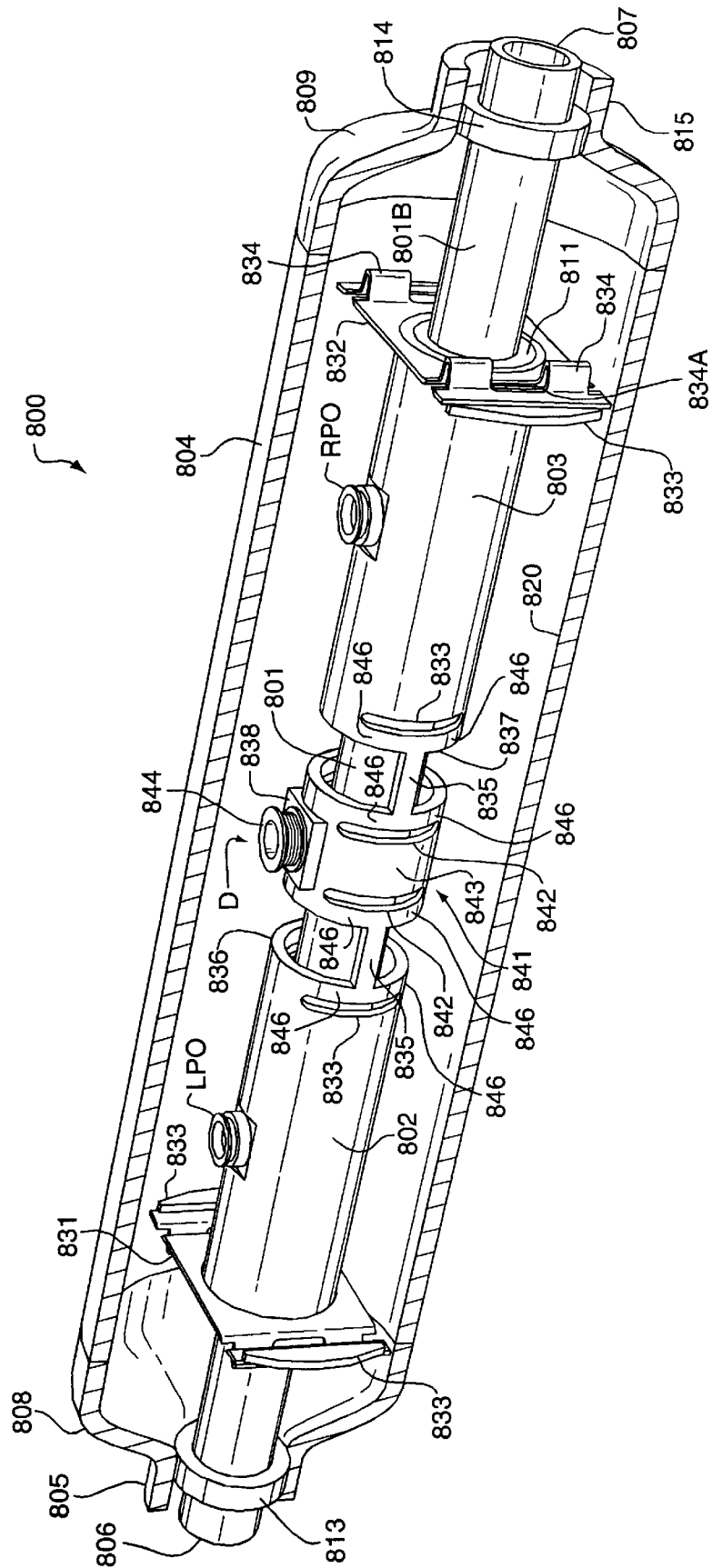
FIGS. 8 and 9 disclose a straight tube Coriolis flowmeter in accordance with a third exemplary embodiment of the invention.
Figure 9:
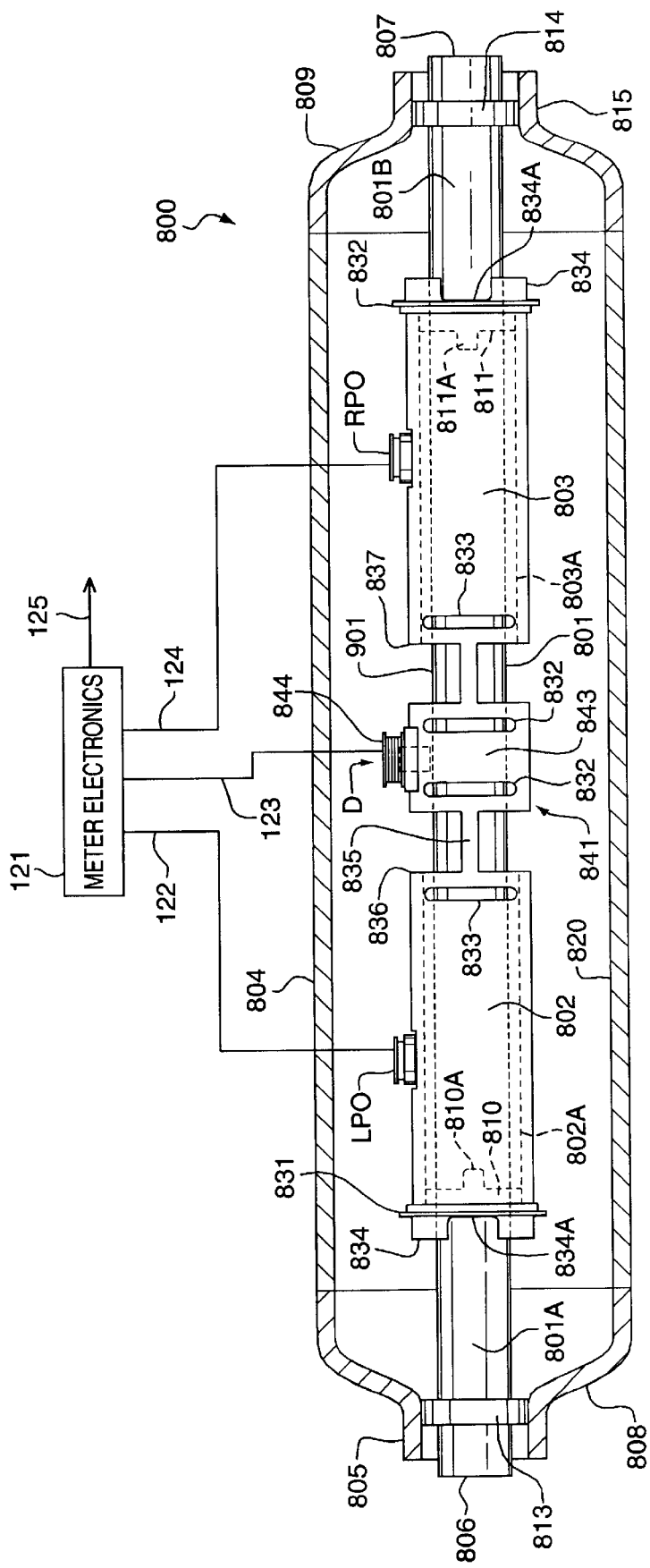

Description of FIGS. 8 and 9

FIGS. 8 and 9 disclose yet another alternative exemplary embodiment comprising Coriolis flowmeter 800 embodying the invention. This embodiment is similar in many respects to the embodiment of FIGS. 2, 6, and 7 with the exception of the drive coil bracket structure in the middle of the balance bar between the balance bar end segments 802 and 803. The embodiment of FIG. 2 has a void 202V for a center section of the balance bar; the embodiment of FIGS. 6 and 7 has a flexible drive coil bracket 640 for the center section of the balance bar. Flowmeter 800 of FIGS. 8 and 9 has a center drive coil bracket 841 that interconnects the inner axial extremities 836 and 837 of balance bar end segments 802 and 803.

Drive coil bracket 841 has an outer circumferential surface 843, a flat 838 on its top portion for permitting the mounting of coil 844 of driver D. Drive coil bracket 841 also has slots 842. Drive coil bracket 841 is connected by support bars 835 to the axial inner extremities 836 and 837 of balance bar end segments 802 and 803. Balance bar end segment 802 has slot proximate its right end; balance bar end segment 803 has slot 833 proximate it's left end. Slots 833 of the balance bar end sections and the corresponding slots 842 of drive coil bracket 841 define leg springs 846 that provide an axial compliance that accommodates thermal expansion and contraction of balance bar end segments 802 and 803. The rear side of the balance bar end segments and the rear side of the drive coil bracket 841 have similar slots that cannot be seen in this view. The compliance provided by leg springs 846 is not as great as that of the preceding two described embodiments. This compliance, however, can significantly lower the stress produced in the flow tube by the expansion and contraction of the balance bar. Slots 832 and 833 also lower the resonant frequency of balance bar end segments 802 and 803 so as to facilitate spring rate balancing of these elements as well, to provide a lower resonant frequency of balance bar ends segments 802 and 803 that permits these elements to have a Coriolis-like response that is in phase opposition to the Coriolis deflections of flow tube 801. The remainder of the elements comprising the embodiment of FIGS. 8 and 9 is similar to that already described for the embodiments of FIG. 2 and FIGS. 6, 7. These elements include case 804, case ends 808 and 809, neck portions 805 and 815, inlet 806, outlet 807, cone connect elements 813 and 814, flow tube section 801A and 801B, case connect links 831 and 832 having out of plane bends 834 and 834A, brace bars 810 and 811 together with brace bar side walls extensions 810A and 81 1A, pick offs LPO and RPO, driver D, inner wall 820 of case 804.

In the same manner as described for the embodiment of FIG. 1, meter electronics 121 applies a signal over path 123 to Driver D to vibrate balance bar 102 and flow tube 101 in phase opposition. Pick offs LPO and RPO detect the vibrations of the flow tube 101 with material flow and generate output signals indicating the magnitude and phase of the Coriolis response. The pick off and output signals are applied over paths 122 and 124 to meter electronics 121 which generates an output on path 125 containing information regarding the material flow.

In summary with respect to the embodiment of FIGS. 8 and 9, the flexible drive coil bracket 841 intermediate balance bar end segments 802 and 803 lowers the resonance frequency in of segments 802 an 803 the drive mode to that of the flow tube. It also lowers the resonant frequency in the Coriolis-like mode to less than the drive frequency. This enhances the Coriolis-like out of phase response of the balance bar end segments 802 and 803 with respect to flow tube 801 and enhances the material flow sensitivity of the Coriolis flowmeter. However, drive coil bracket 841 must be carefully designed to prevent the generation of unwanted vibrations that could adversely affect the accuracy or the output data of the Coriolis flowmeter. This embodiment is advantageous in that the leg-springs 846 defined by the slots 833 and 842 function as springs that flex and protect flow tube 801 from axial stress in response to changes in the axial length of balance bar end segments 802 and 803.

Figure 10:
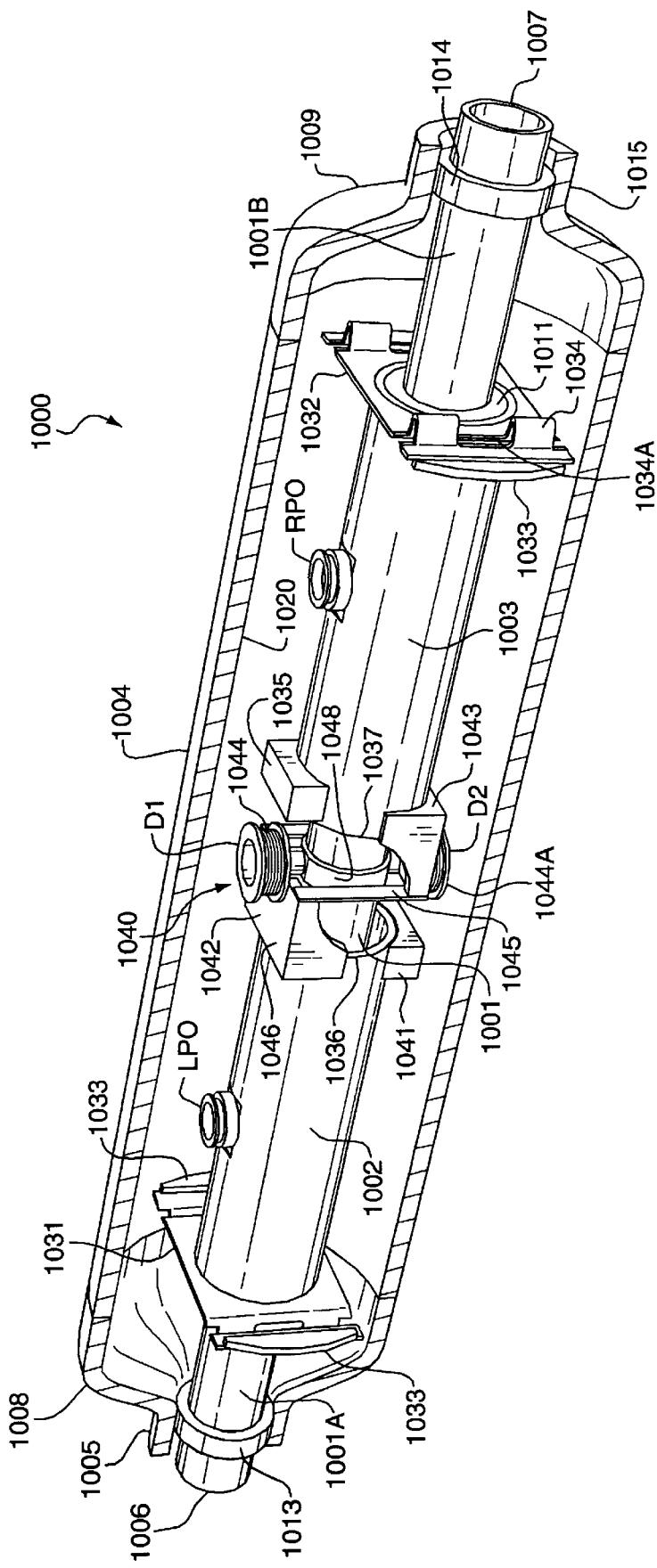
FIGS. 10, 11, and 12 disclose a straight tube Coriolis flowmeter in accordance with a fourth exemplary embodiment of the invention.
Figure 11:
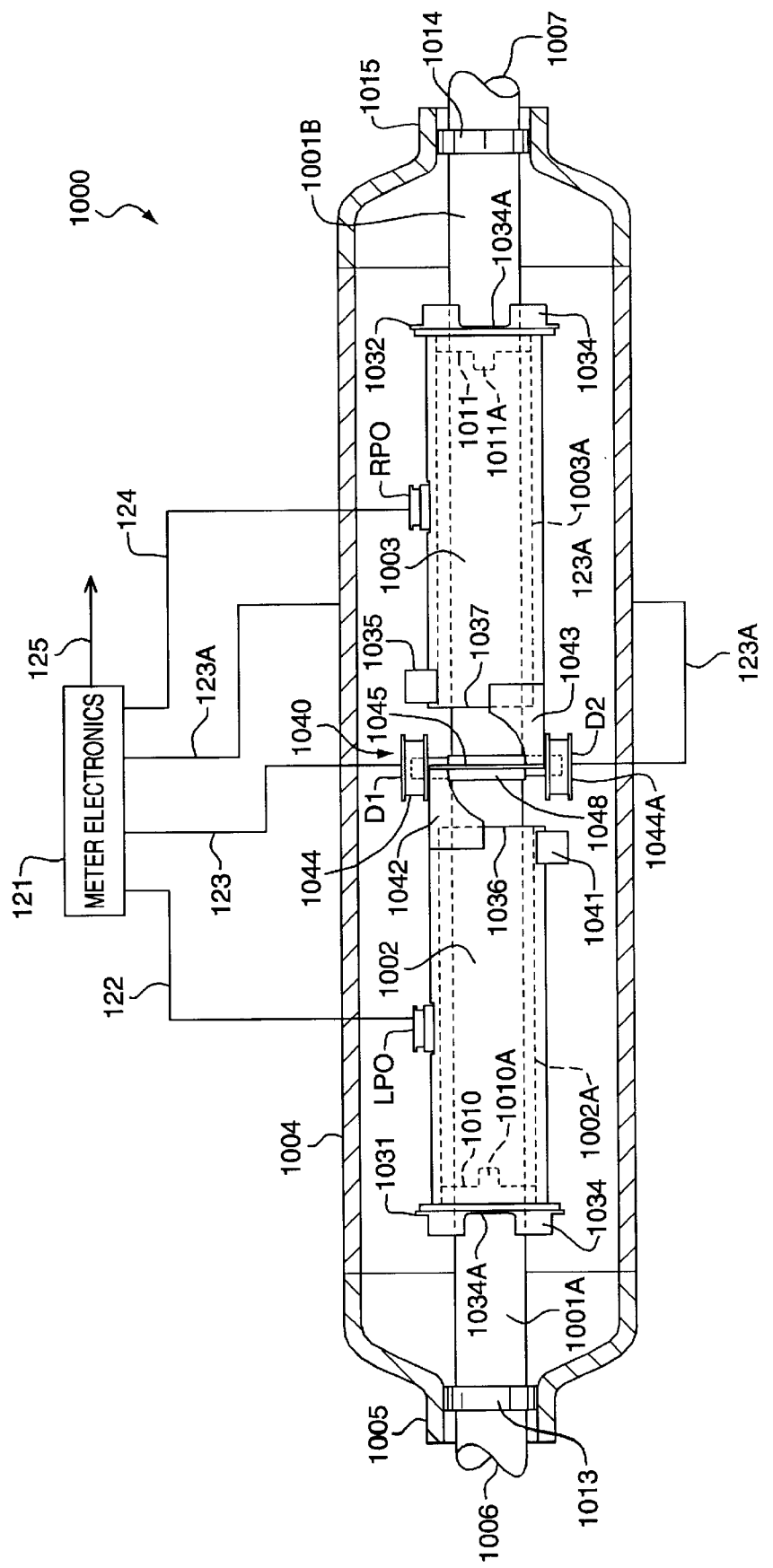
Figure 12:
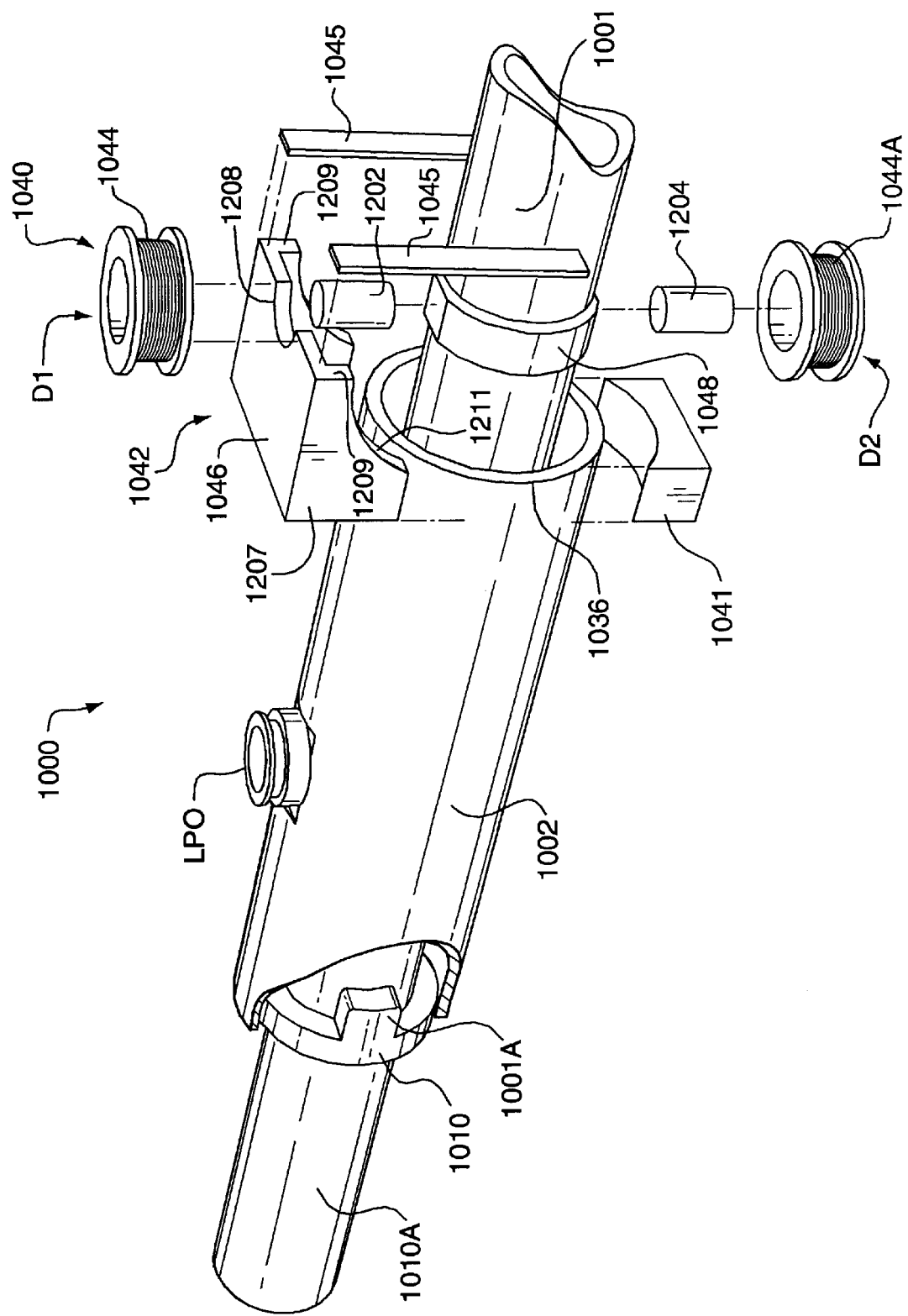

Description of FIGS. 10, 11, and 12

FIGS. 10, 11, and 12 disclose a Coriolis flowmeter 1000 embodying yet another exemplary embodiment of the invention. This embodiment differs from the previously described embodiments only in the details of the center drive coil bracket 1040 which comprises the center portion of the balance bar whose other two segments are left hand end portion 10002 and right hand end portion 10003. The drive coil bracket 1040 includes a pair of drivers D1 and D2, mass element 1041 on the right end of balance bar end segment 1002, mass 1035 on the left end of balance bar end segment 1003, coil brackets 1042 and 1043, leaf springs 1045 which interconnect drive coil brackets 1042 and 1043, driver coils 1044 and 1045 and associated magnets 1202 and 1204, flow tube bracket 1042 having flat surface 1046 for enabling the mounting of coils 1044 and 1044A. As shown in detail in FIG. 12, the top surface 1046 of drive coil bracket 1042 has an arcuate cut out 1208 for receiving magnet 1202. The top ends of leaf springs 1045 are affixed to the right vertical surfaces 1209 of drive coil bracket 1042.

Mass 1035 and drive coil bracket 1043 affixed to balance bar segment 1003 on FIG. 10 not shown on FIG. 12 in order to minimize the complexity of the drawing. However, it is obvious to one skilled in the art that coil 1044 of driver D2 on FIG. 12 would be affixed to drive coil bracket 1043 and that the lower ends of leaf springs 1045 would be affixed to a left vertical surface of coil drive coil bracket 1043.

Leaf springs 1045 moveably couple the center end portions of balance bar segments 1002 and 1003 to enable them to change in length in response to varying thermal conditions. This change in length of balance bar segments 1002 and 1003 results in a flexing of leaf springs 1045 without a resultant stress on the flow tube. In other words, the change in length of balance bar segments 1002 and 1003 results in only a flexing of the leaf springs 1045 and does not result in any stress being applied to flow tube 1001 other than that associated with the small force required to flex springs 1045.

FIG. 12 discloses the details of brace bar 1010 and its lateral projections 1001A which tightly couple the lateral sides of flow tube 1001 to the lateral sides of the inner wall 1002A of balance bar segments 1002, 1003. This coupling raises the frequency of undesired lateral vibrations of the flow tube so that they do not interfere with the drive frequency signals from the velocity sensors.

The embodiment of FIGS. 10, 11, and 12 has a good thermal response since flexible springs 1045 permit the balance bar segments 1002 and 1003 to freely change in length without imparting a resultant stress to flow tube 1001. The center drive coil bracket 1040 has a minimum of spurious vibration modes. Leaf springs 1045 couple the inner ends 1036 and 1037 of balance bar segments 1002 and 1003 so that they are prevented from having significant out of phase motion with respect to each other. As a result, Coriolis-like deflections are not induced in balance bar segments 1002 and 1003. Thus the embodiment of FIGS. 10, 11, and does not have the material flow sensitivity of the previously described embodiments.

Masses 1035 and 1041 provide for increased accuracy by making symmetrical the mass distribution about the plane perpendicular to the drive plane and containing the flow tube axis. Thus, mass 1041 weighs the same as drive coil 1044 plus driver drive coil bracket 1042. Without these added masses a vibration imparted to the meter in the axial direction results in an erroneous flow signal because it imparts a Coriolis-like deflection to the balance bar.

The remainder of the Coriolis flowmeter shown on FIGS. 10,11, and 12 is similar to that already described for the prior embodiments. These elements include case 1004, case ends 1008 and 1009, case necks 1005 and 1015, flow tube inlet 1006 and flow tube outlet 1007, cone connect elements 1013 and 1014, inactive portions 1001A and 1001B of flow tube 1001, case connect links 1031 and 1032 having side extremities 1033 connected to the inner wall 1020 of case 1004, pick offs LPO and RPO, a pair of drivers D1 and D2, drive coil brackets 1042 and 1043, masses 1041 and 1035, out of plane bends 1034 in case connect links 1031 and 1032.

In the same manner as described for the embodiment of FIG. 1, meter electronics 121 applies a signal over path 123 to Driver D to vibrate balance bar 102 and flow tube 101 in phase opposition. Pick offs LPO and RPO detect the vibrations of the flow tube 101 with material flow and generate output signals indicating the magnitude and phase of the Coriolis response. The pick off and output signals are applied over paths 122 and 124 to meter electronics 121 which generates an output on path 125 containing information regarding the material flow.

In summary with respect to the embodiment of FIGS. 10, 11 and 12, flexible drive coil bracket 1040 intermediate balance bar end segments 1002 and 1003 is advantageous in that springs 1045 easily flex and protect flow tube 1001 from axial stress in response to changes in the axial length of balance bar end segments 1002 and 1003. Unlike the previous embodiments, the leaf springs of this embodiment do not lower the frequency of the Coriolis-like deflection enough to increase the sensitivity of the flow meter.

It is to be expressly understood that the claimed invention is not to be limited to the description of the preferred embodiment but encompasses other modifications and alterations within the scope and spirit of the inventive concept. For example, although the present invention has been disclosed as comprising a part of a single straight tube Coriolis flowmeter, it is to be understood that the present invention is not so limited and may be used with other types of Coriolis flowmeters including single tube flowmeters of irregular or curved configuration as well as Coriolis flowmeters having a plurality of flow tubes.

What is claimed is:

1. A Coriolis flowmeter adapted to receive a material flow at an inlet and to extend said material flow through a flow tube to an outlet of said Coriolis flowmeter; said Coriolis flowmeter also includes:

a balance bar positioned parallel to said flow tube;

brace bars coupling ends of said balance bar to said flow tube;

a driver that vibrates said flow tube and balance bar in phase opposition;

pick off means coupled to said balance bar and to said flow tube to generate signals representing the Coriolis response of said vibrating flow tube with material now;

a first end portion of said balance bar extending axially inward from a first one of said brace bars towards a mid-portion of said balance bar;

a second end portion of said balance bar extending axially inward from a second one of said brace bars towards said mid-portion of said balance bar; and an axial mid-portion of said balance bar having a compliance that enables said balance bar to expand and contract axially without imparting any axial stress to said now tube.

2. The Coriolis flowmeter of claim 1 characterized in that said mid-portion of said balance bar is a void.

3. The Coriolis flowmeter of claim 2 includes a case and is characterized in that said flow tube comprises a straight flow tube.

4. The Coriolis flowmeter of claim 3 characterized in that said driver is positioned proximate said mid-portion and is coupled to an exterior surface of said flow tube and an inner wall of said case.

5. The Coriolis flowmeter of claim 3 characterized in that a magnet of said driver is affixed to said exterior surface of said flow tube and a coil of said driver is coupled to said inner wall of said case.

6. The Coriolis flowmeter of claim 3 characterized in that said balance bar is co-axial with said flow tube.

7. The Coriolis flowmeter of claim 3 characterized in that said pick off means comprises a pair of velocity sensors with a first one of said being coupled to said first end portion of said balance bar and to said flow tube and with a second one of said velocity sensors being coupled to said second end portion of said balance bar and said flow tube.

8. The Coriolis flowmeter of claim 3 further comprising a case enclosing said flow tube and said brace bars and said balance bar.

9. The Coriolis flowmeter of claim 3 characterized in that:

said material flow through said vibrating flow tube imparts Coriolis deflections to said flow lube; and said material flow through said vibrating flow tube imparts Coriolis-like deflections to said first and second end portions of said balance bar that are in phase opposition to said Coriolis deflections of said flow tube.

10. The Coriolis flowmeter of claim 3 characterized in said first and second end portions of said balance bar vibrate independently in phase with each other for drive mode vibrations imparted to said flow tube by said driver.

11. The Coriolis flowmeter of claim 10 characterized in that said first and second end portions of said balance bar vibrate out of phase with each other for said Coriolis-like deflections imparted to said balance bar by said Coriolis deflections of said flow tube.

12. A Coriolis flowmeter adapted to receive a material flow at an inlet and to extend said material flow through a flow tube to an outlet of said Coriolis flowmeter; said Coriolis flowmeter also includes:
    a balance bar positioned parallel to said flow tube;
    brace bars coupling ends of said balance bar to said flow tube;
    a driver that vibrates said flow tube and balance bar in phase opposition;
    pick off means coupled to said balance bar and to said flow tube to generate signals representing the Coriolis response of said vibrating flow tube with material flow;
    a first end portion of said balance bar extending axially inward from a first one of said brace bars towards a mid-portion of said balance bar;
    a second end portion of said balance bar extending axially inward from a second one of said brace bars towards said mid-portion of said balance bar;
    an axial mid-portion of said balance bar;
    characterized in that said mid-portion comprises:
    drive coil bracket means; and
    spring means oriented substantially perpendicular to the longitudinal axis of said flow tube and coupling said drive coil bracket means to the axial inner extremities of said end portions of said balance bar, said spring means having an axial compliance that enables said end portions of said balance bar to change in length without imparting any axial stress to said flow tube exclusive of the stress associated with the force required to flox said spring means as said length of said end portions change.

13. The Coriolis flowmeter of claim 12 characterized in that said spring means flex as the axial length of said end portions of said balance bar changes with the only resultant axial stress imparted to said flow tube being the stress required to flex said springs means.

14. The Coriolis flowmeter of claim 13 characterized in that said flow tube comprises a single straight flow tube.

15. The Coriolis flowmeter of claim 12 characterized in that said balance bar is co-axial with said flow tube.

16. The Coriolis flowmeter of claim 12 characterized in that said pick off means comprises a pair of velocity sensors with a first one of said velocity sensors being coupled to said first end portion of said balance bar and to said flow tube and with a second one of said being coupled to said velocity sensors second end portion of said balance bar and said flow tube.

17. The Coriolis flowmeter of claim 12 further comprising a case enclosing said flow tube and said brace bars and said balance bar.

18. The Coriolis flowmeter of claim 12 characterized in that:
    said material flow through said vibrating flow tube imparts Coriolis deflections to said flow tube; and
    said material flow through said vibrating flow tube imparts Coriolis-like deflections to said first and second end portions of said balance bar that are in phase opposition to said Coriolis deflections of said flow tube.

19. The Coriolis flowmeter of claim 12 characterized in said first and second end portions of said balance bar vibrate independently in phase with each other for drive mode vibrations imparted to said flow tube by said driver.

20. The Coriolis flowmeter of claim 19 characterized in that said first and second end portions of said balance bar vibrate out of phase with each other for said Coriolis-like deflections imparted to said balance bar by said Coriolis deflections of said flow tube.

21. The Coriolis flowmeter of claim 12 characterized in that:
    a first end of said spring means is coupled to said drive coil bracket means;
    a second end of said spring means is coupled to the axial inner extremity of said end portions of said balance bar; and
    said spring means flexes in response to said axial changes in length of said end portions of said balance bar.

22. The Coriolis flowmeter of claim 21 characterized in that said drive coil bracket means comprises:
    a drive coil bracket having a flat surface parallel to a longitudinal axis of said flow tube;
    a second bracket having a surface parallel to said longitudinal axis of said flow tube;
    said spring means comprises a first set of springs coupling said first drive coil bracket to said axial inner extremities of said end portions of said balance bar;
    said flat surface of said first drive coil bracket is adapted to receive a coil of said driver;
    a drive magnet is coupled to said flow tube and in magnetic communication with said drive coil;
    said spring means further comprising a second set of springs coupling said second said drive coil bracket to said axial a inner extremities of said end portions of said balance bar; and
    a mass affixed to said flat surface of said second bracket.

23. The Coriolis flowmeter of claim 22 characterized in that said springs of said first and second set have ends coupled to said inner axial extremities of said balance bar end portions.

24. The Coriolis flowmeter of claim 12 characterized in that:
    said drive coil bracket means is coaxial with said flow tube and has an axial length less than the distance between said axial inner extremities of said balance bar end portions;
    elongated support bars couple said axial inner extremities of said balance bar end portions to the axial outer extremities of said drive coil bracket means;
    said elongated support bars are positioned in a vibrationally neutral plane of said balance bar and are oriented parallel to said longitudinal axis of said flow tube;
    slots are in the walls of said drive coil bracket means, said slots are parallel to and proximate said outer axial extremities of said drive coil bracket means; and
    the wall material of said drive coil bracket means between said slots and said outer axial extremities of said drive coil bracket means define a first set of springs that flex in response to changes in the axial length of said balance bar end portions.

25. The Coriolis flowmeter of claim 24 characterized in that:
    circumferentially oriented slots are in the walls of said balance bar end portion proximate said axial inner extremities of said balance bar end portions, and the wall material between said slots and said balance bar end portions define a second set of springs that flex axially in response to changes in the axial length of said balance bar end portions and in response to changes in the length of said flow tube.

26. The Coriolis flowmeter of claim 25 characterized in that:

said support bar and set first and second set of springs define springs that flex in response to changes in the axial length of said balance bar end portions without imparting axial stress to said flow tube in excess of the stress associated with the force required to flex said first and second set of springs and said support bar.

27. The Coriolis flowmeter of claim 26 characterized in that:

a top portion of said drive coil bracket means has a flat surface with an opening for receiving a coil of said driver;

a magnet of said driver is in electromagnetic communication with said drive coil and is coupled to said flow tube.

28. The Coriolis flowmeter of claim 26 characterized in that:

said drive coil bracket means is cylindrical and has a diameter substantially equal to the diameter of said balance bar.

29. The Coriolis flowmeter of claim 12 characterized in that said drive coil bracket means comprises:

a first drive coil bracket affixed to a top portion of said first balance bar end portion proximate said inner axial extremity of said first end portion;

a second drive coil bracket affixed to a bottom portion of said second balance bar end portion proximate said inner axial extremity of said second end portion;

spring means oriented substantially perpendicular to said longitudinal axis of said flow tube that couples said first drive coil bracket to said second drive coil bracket;

said spring means is adapted to flex about its end in response to changes in the axial length of said end portions of said balance bar; and said spring means having a flexibility that enables said end portions of said balance bar to change in length to change in length without imparting a stress to said flow tube in excess of a stress associated with the force required to flex said spring means.

30. The Coriolis flowmeter of claim 29 characterized in that said spring moans comprises:

a first end of said spring means coupled to said first drive coil bracket; and a second end of said spring means coupled to said second drive coil bracket.

31. The Coriolis flowmeter of claim 30 further including:

a first mass affixed to a lower portion of said inner axial extremity of first end portion of said balance bar, and a second mass affixed to an upper portion of said inner axial extremity of said second end portion of said balance bar.

32. The Coriolis flowmeter of claim 31 characterized in that said driver comprises:

a first drive coil affixed to a surface of said first drive coil bracket;

a first magnet in magnetic communication with said first drive coil and affixed to said flow tube;

a second drive coil affixed to a surface of said second drive coal bracket;

a second magnet in magnetic communication with said second drive coil and affixed to said flow tube; and said drive coils being and said magnets being effective in response to the receipt of a drive signal coils for vibrating said flow tube and said balance bar in phase opposition.

* * * * *